United States Patent [19]

Deweerdt

[11] Patent Number: 5,365,906
[45] Date of Patent: Nov. 22, 1994

[54] FLUID FLOW CHECK VALVE FOR FUEL SYSTEM

[75] Inventor: Kevin R. Deweerdt, Walled Lake, Mich.

[73] Assignee: Chrysler Corporation, Highland Park, Mich.

[21] Appl. No.: 169,245

[22] Filed: Dec. 20, 1993

[51] Int. Cl.⁵ .................... F02M 41/00; F16K 15/00
[52] U.S. Cl. .................... 123/467; 123/510; 137/515; 137/533.17; 285/317
[58] Field of Search ........... 123/510, 467, 506, 512, 123/469, 468; 137/533.17, 533.19, 533.31, 535, 515, 515.5; 285/317, 33

[56] References Cited

U.S. PATENT DOCUMENTS

| | | | |
|---|---|---|---|
| 2,649,277 | 8/1953 | Blackford | 137/515 |
| 2,918,083 | 12/1959 | Clark | 137/515.5 |
| 2,981,322 | 4/1961 | Schom | 137/515.5 |
| 3,742,926 | 7/1973 | Kemp | 123/467 |
| 3,826,523 | 7/1974 | Eschbaugh | 285/39 |
| 3,831,629 | 8/1974 | Mackal | 137/535 |
| 3,955,542 | 5/1976 | Skaggs | 137/515 |
| 4,246,876 | 1/1981 | Bouwkamp | 123/467 |
| 4,310,017 | 1/1982 | Raines | 137/533.17 |
| 4,336,781 | 6/1982 | Overfield | 123/467 |
| 4,492,249 | 1/1985 | Arino | 137/515 |
| 4,502,662 | 3/1985 | Maldaus | 137/533.17 |
| 4,660,803 | 4/1987 | Johnston | 137/533.17 |
| 4,856,823 | 8/1989 | Heren | 137/533.17 |
| 4,863,201 | 9/1989 | Carstens | 285/317 |
| 4,964,391 | 10/1990 | Hoover | 123/510 |
| 5,161,834 | 10/1992 | Norkey | 285/317 |
| 5,295,469 | 3/1994 | Kariya | 123/467 |
| 5,299,541 | 4/1994 | Yamaguchi | 123/468 |

Primary Examiner—Carl S. Miller
Attorney, Agent, or Firm—Kenneth H. MacLean

[57] ABSTRACT

A fluid flow check valve assembly having a tubular valve housing with opposite inlet and outlet end portions and a movable valve member therebetween. The valve member has an end sealing portion engageable with an inlet seating portion of the housing and a flexible annular lip seal portion engageable with the inner wall of the housing. When the assembly is in a first pre-assembly condition which exists prior to insertion of the end of a mating outlet tube into the housing, the valve member assumes a mid-portion in the housing spaced away from the inlet seating portion. In this pre-assembled condition, the valve member's lip seal portion is seated against the inner wall of the housing thereby blocking fluid flow through the check valve assembly. The insertion of an outlet tube into the housing moves the valve member from the preassembly mid-position toward the inlet end of the housing and into a second one-way controlled flow condition. In the second condition, the valve member's end valve portion engages the inlet seating portion and the lip seal is biased inwardly away from the housing wall by convolutions or flutes formed in the end of the housing. The seating of the end valve portion against the inlet seating portion prevents fluid flow until the fluid inlet pressure increases sufficiently to unseat the end valve portion.

10 Claims, 3 Drawing Sheets

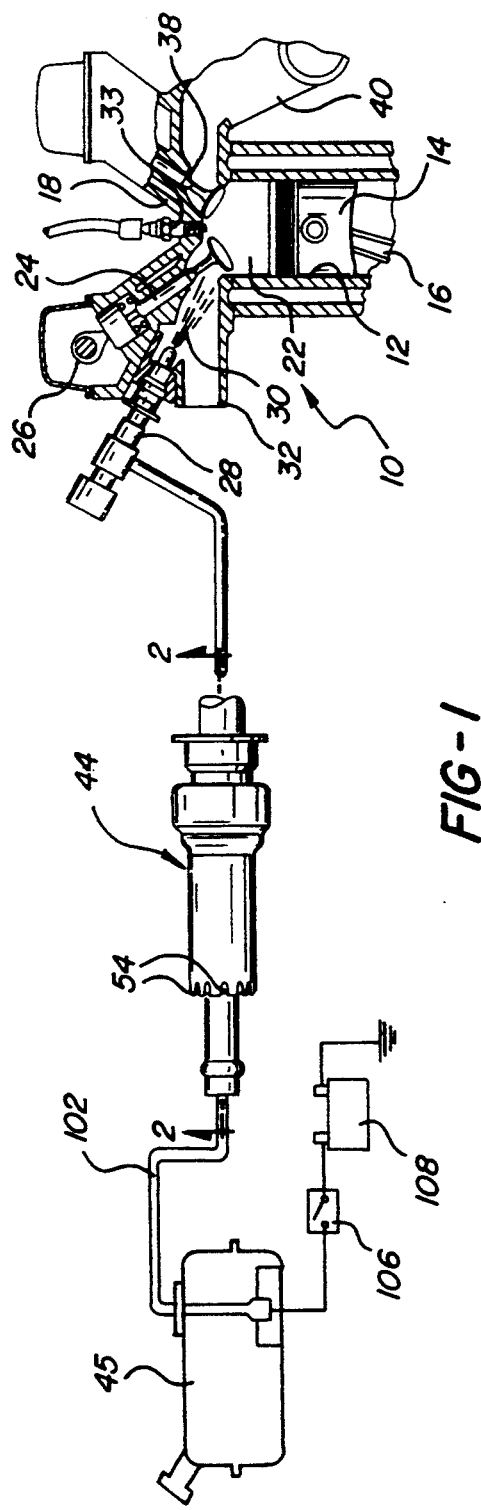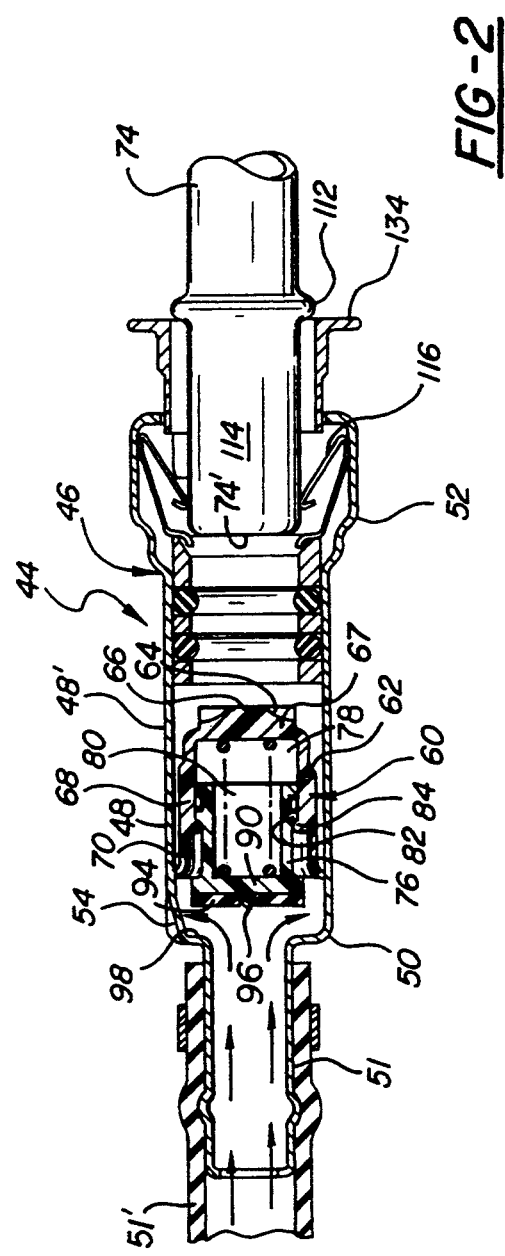

FLUID FLOW CHECK VALVE FOR FUEL SYSTEM

TECHNICAL FIELD

This invention relates to a check valve assembly for fluid flow, and more particularly, to a new and improved quick-connect check valve for a vehicle fuel system with a first pre-assembly operative condition which prevents flow therethrough until the valve assembly and fuel line are properly hooked-up and thereafter blocks flow to the vehicle engine during engine shut-down when the fuel's inlet pressure is relatively low.

DESCRIPTION OF RELATED ART

Prior to the present invention, various control or check valves for vehicle engine fuel systems have been devised. In U.S. Pat. No. 4,964,391, for example, a check valve is disclosed for installation in the fuel line between the fuel pump and engine to prevent back flow of fuel from the engine to the pump. In addition to check valves, a wide range of quick-connect units are known, such as shown in U.S. Pat. No. 3,826,523. These units have been devised to provide for the rapid connection of tubing with good fluid sealing for use in a vehicle fuel system. While such prior art constructions were satisfactory for their intended purposes, they do not provide the following features: (1) a preassembly "no-leak" condition; (2) a quick-connection for conducting lines or tubes; and (3) a positive sealing and one-way flow control to prevent hydraulic engine lock.

In preferred embodiments of the present invention, there is provided a new and improved one-way, quick-connect check valve for a vehicle fuel system for an internal combustion engine which features a multi-position valve member having a flexible bell-shaped outer lip seal that fits slidingly into a tubular connector housing and in a first operative pre-assembly position of the valving member seats outwardly against the inner wall to block the flow of fuel therethrough to prevent leakage prior to a proper hook-up of a fuel outlet line to the check valve assembly. When an end of an outlet tube is inserted into the housing for hook-up, the tube contacts the valve member and moves it to its second operative condition in which an end seal or valving portion of the valve member engages the inlet seating portion of the housing to block leakage of fuel from the valve assembly. In the event the outlet tube is not completely inserted into the valve housing, the lip seal remains in sealing contact with the inner wall of the valve housing to prevent fuel from passing through the valve assembly.

On movement to the second operative condition, the valve member's lip seal is deflected inward from the inner wall surface by an annular arrangement of corrugations or flutes formed in the housing adjacent the inlet seating portion. This inward deflection produces fuel conducting passages between contact points or apexes of the corrugations and the lip seal. In this second operative condition, the end valve portion of the valve member is seated against the inlet seating portion to block the flow of fuel at relatively low pressure. When the fuel pressure increases sufficiently by action of the fuel pump, a force on the valving member is generated which unseats the end valve portion and allows fuel to flow from the pump to the engine.

These and other features, objects and advantages of the present invention will become more apparent from the following:

BRIEF DESCRIPTION OF THE DRAWINGS

FIG. 1 is a somewhat schematic elevational view of a vehicle fuel supply system for an engine with some portions in cross-section and showing a first embodiment of the check valve assembly; and FIG. 2 is an enlarged sectioned view of the valve assembly taken along section line 2—2 in FIG. 1 and showing the valve in a first pre-assembly operative condition which occurs prior to completing a proper hook-up with a fuel outlet tube.

DETAILED DESCRIPTION OF THE DRAWINGS

Figure 5:
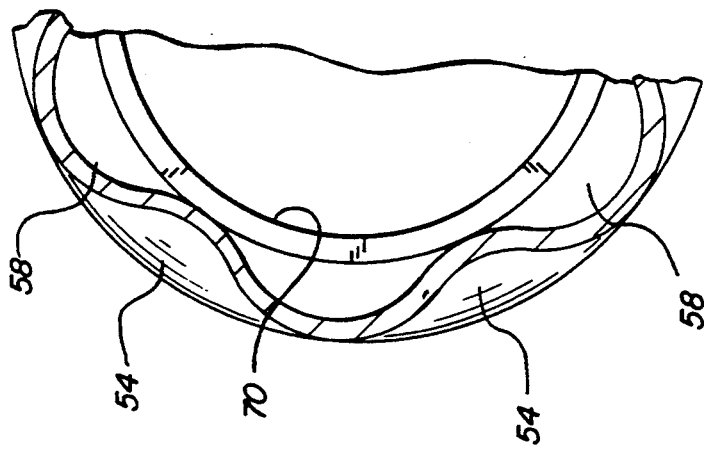
FIG. 5 is a greatly enlarged sectioned and partial view of the valve assembly taken along section lines 5—5 in FIG. 4.

Turning now in greater detail to FIG. 1 of the drawings, a fuel system for a vehicle engine is somewhat diagrammatically illustrated. An internal combustion engine 10 has an engine block with a plurality of cylinders formed therein. Such cylinders and related components are exemplified by cylinder 12 in which a piston 14 is operatively mounted for reciprocal movement. The piston 14 is operatively connected by a connecting rod 16 to a crankshaft (not shown) which provides the output torque for powering the vehicle as well as many vehicle accessories.

Secured to an upper end of the engine block is a head 18 which cooperates with the pistons to form combustion chamber 22. An intake valve 24 is opened by a cam of a camshaft 26 so that a fuel injector 28 can inject a charge of "atomized" fuel 30 therein. The injected fuel readily mixes with air from air intake manifold 32 for ignition by a sparking plug 33 on closure of the intake valve by a conventional spring unit not shown. The combustion energy drives the piston downward in a power stroke to turn the crank.

During exhaust the piston is pushed upward by the crank while exhaust valve 38 in the head is opened by an associated cam on a camshaft, not shown, so that combustion gasses are forcibly discharged through exhaust manifold 40 and then through the exhaust system of the vehicle.

To prevent drain of fuel into the combustion chamber 22 such as might occur when the vehicle engine is not in operation and the intake valve is open and a fuel injector is stuck in an open position, the present invention employs a fluid flow check valve 44 in the fuel line between the fuel tank 45 and the injector 28.

A First Embodiment

In a first embodiment, the check valve 44 comprises a stepped diameter tubular housing 46 of thin walled sheet metal or molded from a suitable plastics material. The housing has a centralized main portion or mid-portion 48 shouldered at 50 and stepped into an axially reduced diameter inlet portion or fitting 51 adapted to be attached to an inlet supply line or tube 51'. An enlarged connector head portion 52 extends from the other end of the main body portion. The mid-portion 48 defines a cylindrical inner wall 48'. At the leftward end of the housing 46, an annular shoulder 50 is formed with circumferentially spaced and angularly inclined flutes or concave corrugations 54 to provide internal fluid flow channels 58 therebetween in the shoulder area to allow fluid to flow through the check valve under operating conditions as will appear below.

A multi-element valve capsule 60 is operatively mounted within the main body portion 48 of the housing 46 which is comprised of a cup like outer valve member 62 of a suitable elastomer or rubber-like material that has a contact portion 66 diametrically extending across an inner end 67, a cylindrical side wall 68 which is spaced from the inner wall of the central-section of the tubular housing 46 and which terminates in a thin-walled annular lip seal 70.

FIG. 2 illustrates a pre-assembly operative position in which an outlet supply line or tube 74 is not fully installed or inserted into the housing 46. In this position, the lip seal 70 is in sealing contact with the cylindrical inner wall 48' of housing portion 48. This engagement between seal 70 and wall 48' prevents any flow of fuel through the check valve prior to proper insertion of fuel line 74 in the housing. Thus fuel will not inadvertently leak through the valve while awaiting assembly with the tube 74.

Figure 3:
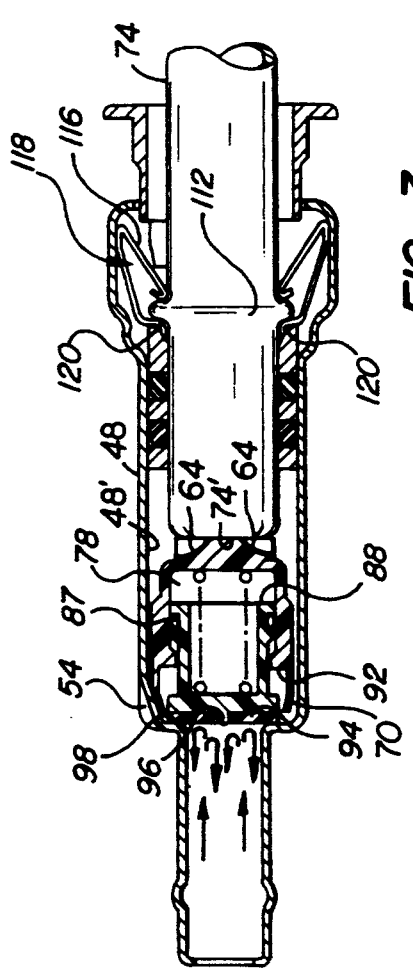
FIG. 3 is a sectional view similar to FIG. 2 but illustrating a second operative use condition which occurs after a proper insertive attachment of an outlet tube with the valve assembly but before the fuel pump generates a significant fuel inlet pressure.

Between the positions shown in FIGS. 2 and 3, the tube 74 is moved from the pre-assembly position to an installed position by a full insertion of the tube 74 into housing 46. Specifically, upon insertion the end 74' of the tube 74 engages the end contact portion 66 of the valve capsule 60 to shift the capsule 60 axially to the left into an installed position shown in FIG. 3. In the installed position, lip seal 70 is deflected radially inward by flutes 54 so that the fluid flow passages 58 are formed between the flutes 54 and the lip seal 70. Resultantly, fuel can flow around the valve capsule 60 and between it and the inner wall 48' of the housing. The contact portion 66 has a plurality of cut-out channel portions 64 to allow fuel to flow into the tube 74.

In addition to the outer cylindrical valve member 62, valve capsule 60 has an inner cylindrical valve member 76 telescopically mounted therewith. These two members form a cavity 78 housing a helical compression spring 80. The outwardly telescoped or extended position of the valve member is shown in FIG. 2 with annular stop shoulders 82 and 84 on the inner and outer members in contact with one another to limit the outer extent of travel. The chamber is sealed by an 0-ring 87 to prevent the accumulation of fluid therein during operation.

Figure 4:
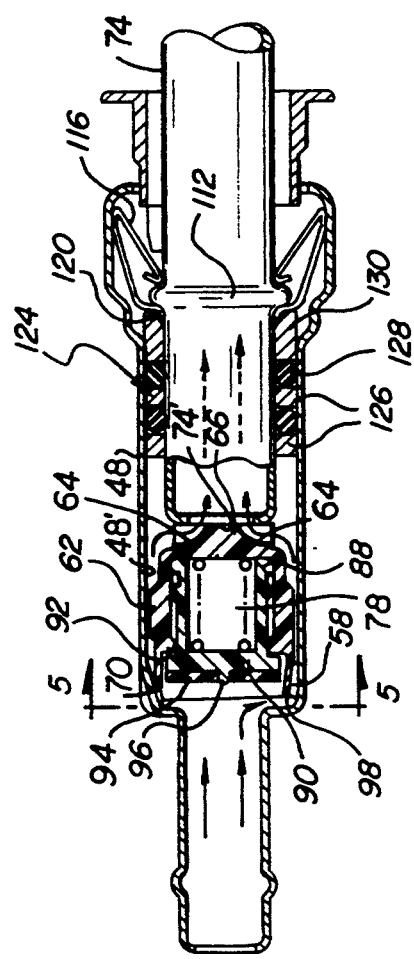
FIG. 4 is a sectional view similar to FIG. 3 but illustrating the second operative condition after operation of the fuel pump increases fuel inlet pressure sufficiently to open the valve assembly.

In the telescopically collapsed position of FIG. 4, the inner end 88 of the inner valve member contacts the inner end surface of the outer valve member 62 to limit the extent telescopic contraction. Also the rim of the head 90 of the inner valve member contacts an interior stop shoulder 92 of the outer valve member to limit the telescopic contraction of the capsule.

The head portion 90 of the inner valve member is provided with an outer annular sealing member 94 which is retained thereon by centralized retainer and guide 96. In the extended position shown in FIG. 3, this sealing member 94 engages the annular seat 98 formed on the shoulder between the inlet fitting 51 and the larger diameter central portion 48 of the housing. When engaged by the seal member 94, the valve capsule is effective to prevent flow through the valve 44 of low pressure fuel supplied into the inlet of fitting 51 from the tank 45. A pump 100 operatively mounted in the tank which is connected to the inlet fitting by a line 102 which may be secured on the inlet fitting by suitable hose clamp 104. The pump is electrically operated when the ignition 106 is closed to allow current to flow from the battery 108 to the pump so that it will operate to pump fuel to the valve at a predetermined pressure. When the force of the pressurized fuel on the sealing member 94 is greater than the opposing force of spring 80. The inner valve member will move from the FIG. 3 to the FIG. 4 position. With the inner valve element moved to the inwardly telescoped position, the fuel will flow through the passages 58 between the lip seal and the flutes and around the outer portion of the outer valve element into the end of the supply line, as shown by flow arrows F. Because of the reduced thickness of contact 66 sufficient opening remains in the end of the supply line 74 to permit this flow.

In this invention, the supply line is moved from the position of FIG. 2 to contact, displace and retain the valve capsule in its check valve operating position in FIG. 3. In this position the valve capsule closes the line from the fuel tank to the injector. In this latter position, if the injector is in an open condition and the ignition is "off", it cannot leak fuel into the cylinder to hydraulically lock the engine and adversely affect engine starting. If the supply line has not been properly attached to the check valve, the lip seal is effective to prevent such hydraulic lock.

To insure that the supply line 74 is properly installed in a sealed position within the one-way valve housing, the tube is inserted and retained in the FIGS. 3 and 4 position. It will be noted that the supply line 74 is formed with a collar 112 adjacent the insert end 114 thereof on this movement. The collar 112 engages the spring fingers 116 of a tube retainer 118 which is mounted within the head 52 of the housing 44. The collar 112 is trapped between the hooked free ends of the spring fingers 116 and the inwardly extending end 120 of the spring retainer.

As shown, the end of the supply line 74 is inserted through an annular fluid seal assembly 124 which comprises a plurality of washer members 126 and interposed O-ring seals 128. At the outboard retainer end of this sealing assembly is an annular spring retainer member 130 which provides a seat for the end 120 of the retainer 118.

In the position of FIGS. 3 and 4, the retainer 118 has fully captured the supply line 74 within the head and the supply line is sealed therein by the sealing unit. Accordingly, there can be no inadvertent removal of the line from the housing. The supply line is removed from the housing by moving a cylindrical release unit 134 disposed around the supply line to an internal position within head portion 52 to deflect the spring fingers 116 from their retainer position to a released position clear of the collar 112.

In the FIG. 4 position of the capsule, high pressure fuel will constrict the capsule so that the seal 94 will move off of the valve seat 98. The fuel will flow through passages 58 around the constricted lip seal and around the exterior of the outer valve member 62 of the capsule into the open end portion of the supply line and into the injectors 28 supplying fuel into engine so that the engine can be operated to provide the torque for driving the vehicle and the vehicle accessories.

On engine shut-down the ignition key is turned to an off position to stop pump operation and the supply of pressure fuel into line 102. The spring 80 will resultantly move the inner valve member to its closed position, shown in FIG. 3. In this position, the low pressure fluid in the tank is completely blocked from the compression chamber and there can accordingly be no fuel leakage thereto regardless of condition of the intake valves and the injector. Accordingly, there will be no buildup of fuel or hydraulic lock in the cylinders.

In the FIG. 2 position the capsule is shown prior to installation of the feed tube. However, in this position the safety seal effectively blocks any leakage from the fuel tank and prevents the contamination of any material into this tank.

With this construction, the capsule is inserted into the housing prior to the insertion of the feed pipe so that there is blockage of fluid from the gas tank through the one-way valve. This also prevents any contaminates from entering into the gas tank through the one-way valve.

A Second Embodiment

FIGS. 6–10 illustrates a second embodiment of the check valve assembly 130. The valve assembly 130 includes a thin walled tubular housing 132 having a cylindrical inner wall 134 and an inlet end portion 136 which defines an inlet fitting with an inlet passage 138 opening into the housing. The inlet end portion 136 is joined with the main body of housing 130 by a shoulder portion 140 which forms a valve seating portion about the inlet 138. The inlet fitting 136 is attached to a fuel inlet hose 142 from the pump. The hose is slipped over the end fitting and is secured thereon by a clamp 144. The inlet fitting 136 also has a raised beaded portion 146 over which the hose 142 extends to form a better seal with the hose.

Figure 6:
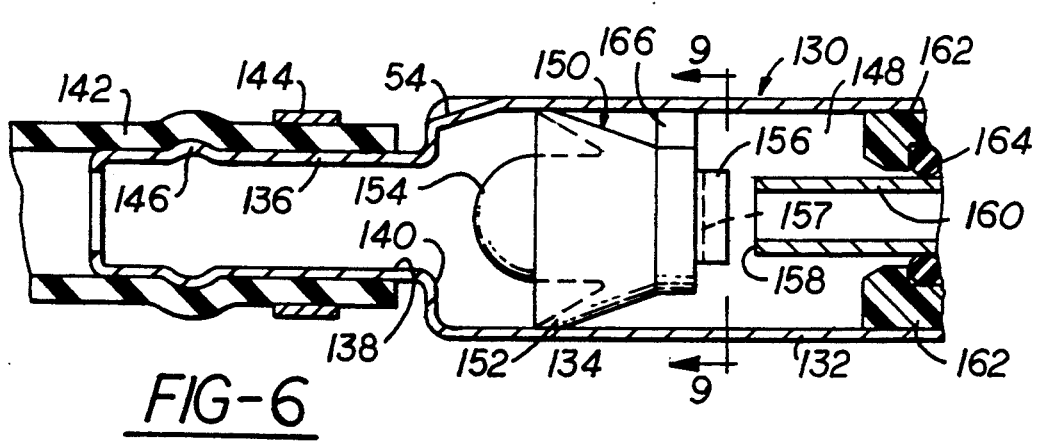
FIG. 6 is a sectioned partial view of a second embodiment of the subject check valve in the first pre-assembly operative condition which corresponds to the condition shown in FIG. 2.
Figure 7:
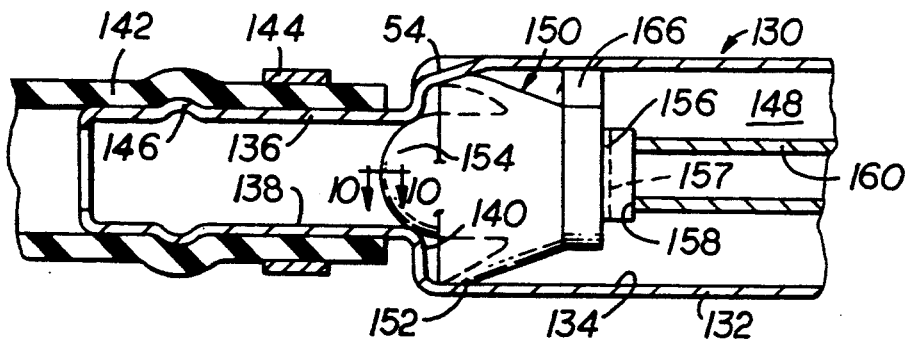
FIG. 7 is a sectioned partial view similar to FIG. 6 but in the second operative use condition which corresponds to the condition shown in FIG. 3.
Figure 8:
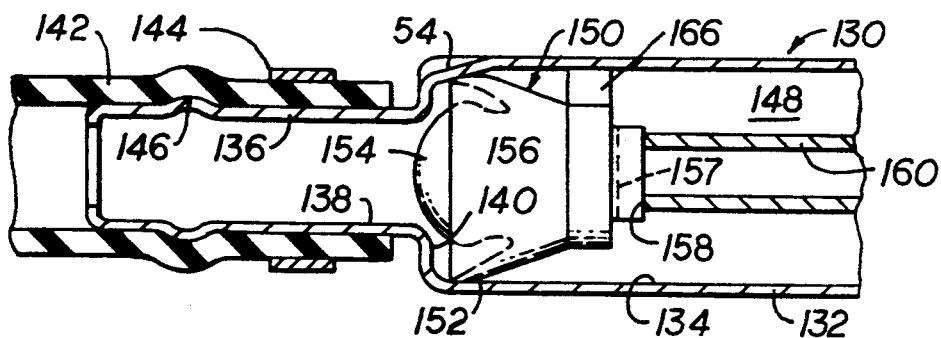
FIG. 8 is a sectioned partial view similar to FIG. 7 in the second operative use condition which corresponds to the condition shown in FIG. 4.

An interior space 148 of the housing 132 supports a movable one-piece valve member 150 as best shown in FIGS. 6–8. The valve member 150 has an air filled hollow bulb-like construction and is formed of relatively thin rubber-like material such as Vitron. The member 150 includes an annular lip seal portion 152 and a rounded end valving portion 154. A rigid insert member 156 of plastic material or aluminum is attached to the bulb-like elastic portion at the rightward end opposite to end portion 154. The end of the insert 156 is adapted to be engaged by an end 158 of an outlet tube 160 when the tube is inserted into housing 132. The insert 156 has a generally flat end for contact with the tube but has a channel 157 formed therein to allow fuel flow from space 148 into the tube interior.

The tube 160 is adapted to be connected to the housing in the same or a similar manner as shown in FIGS. 2–4. Accordingly, details of the connection have not been repeated. However, in FIG. 6, the inner end portion 162 of an O-ring seal carrier is visible as are portions of an O-ring seal 164. The seal 164 engages the outer surface of the tube 160.

Figure 9:
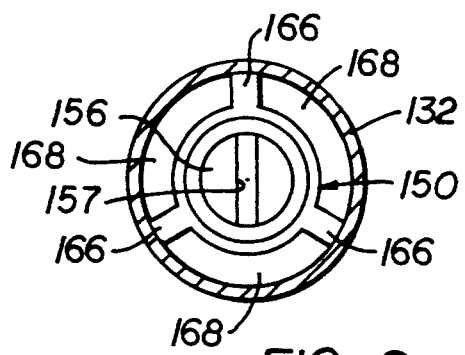
FIG. 9 is a sectional view taken along section line 9—9 in FIG. 6 and looking in the direction of the arrows.

Referring to FIG. 9, it can be appreciated that valve member 150 has three outwardly extending tabs portions 166. These contact the inner wall 134 of housing 132 and center the valving member 150 as well as provide flow passages 168 around it as best shown in FIG. 9.

The overall operation of valve assembly 130 is the same as with assembly 44. FIG. 6 shows valve member 150 in the first pre-assembly operative position before the completion of the hook-up between housing 132 and outlet tube 160 which corresponds to the condition of the first embodiment in FIG. 2. In this operative condition, fuel leakage is prevented by the sealing of lip seal 152 against wall 134.

In FIG. 7, the valve member 150 is shown in the second operative use position which corresponds to the condition of the first embodiment in FIG. 3. In this operative condition, a full insertion of end 158 of tube 160 moves the valve member 150 to the left. This movement of the valve 150 toward the flutes or concave corrugations 54 eventually unseats the lip seal 152 from wall 134 and seats the end valving portion 154 against the seating portion 140 to block fuel flow when the fuel inlet pressure is insufficient to unseat valving portion 154.

In FIG. 8, the valve member 150 is again shown in the second operative condition as corresponds to the condition of the first embodiment shown in FIG. 4. In this operative condition, as in FIG. 7, insertion of tube 160 has moved valve member 150 fully to the left which normally seats the end valving portion 154 against the seating portion 140 to block fuel flow. However, increased fuel inlet pressure from the pump during engine operation produces a sufficient force to flattenly distort the valve portion 154 as illustrated in FIG. 8. This flattening shifts the surface away from the seating portion 140 to permit fuel to flow to the engine.

Figure 10:
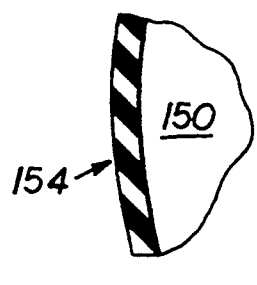
FIG. 10 is a greatly enlarged sectional view taken along section line 10—10 in FIG. 7 and looking in the direction of the arrows.

As previously mentioned, valve member 150 is an air filled bulb-like construction of relatively thin walled material such as Vitron which is an artificial rubber-like material. The insert 156 is sealingly attached to the rightward end of the bulb which traps the air therein and provides a sufficient degree of rigidity while permitting the valving portion 154 to flattenly distort as shown in FIG. 8. Configuration details are shown in FIGS. 9 and 10.

While preferred embodiments of the invention have been shown and described, other embodiments will now become apparent to those skilled in the art. Accordingly, this invention is not to be limited to that which is shown and described but by the following claims.

What is claimed is:

1. A fluid flow check valve for operatively connecting first and second flow conductors and being operative to open under the force of a sufficient fluid pressure in the first flow conductor to allow fluid to flow through the check valve from the first to the second flow conductor, said check valve comprising: a tubular housing with an inner cylindrical wall and valve seat means adjacent one end thereof; a valving member operatively mounted within said housing and movable away from and toward said valve seat means; a first sealing portion disposed on one end of said valving member and engageable with said valve seat means to block fluid flow through said housing when a force generated by said fluid pressure on said valving member is insufficient to unseat said first sealing portion; an annular lip seal means on said valving member spaced outward from said first sealing portion and being engageable with said inner surface of said housing to block fluid flow through said housing when said valving element is in a first pre-assembly position with said first sealing portion spaced from said valve seat means; means on said housing to deflect said lip seal means away from sealing engagement with said cylindrical wall as the valving member is moved toward the valve seating means; means for moving said valving member from said first pre-assembly operative position to a second operative position in which said lip seal means is deflected from fluid sealing engagement with said inner surface and said first sealing portion of said valving member is positioned to engage said valve seat means.

2. The check valve set forth in claim 1 in which said first sealing portion of said valving member is movable from said valve seat means without corresponding movement of said valving member relative to the housing in response to a force generated by increased fluid pressure acting on the first sealing portion.

3. The check valve set forth in claim 2 in which said first sealing portion of said valving member is yieldably biased against said valve seat means when the valving member is in the second operative position.

4. The check valve set forth in claim 3 in which a spring provides said yieldable biasing of the first sealing portion against said valve seat means.

5. The check valve set forth in claim 3 in which the valving member has a hollow bulb-like construction and an elastic wall so as to be sufficiently deformable in response to a force produced by fluid pressure acting against the first sealing portion.

6. A fluid flow check valve for operatively connecting first and second flow conductors and being operative to open under the force of a sufficient fluid pressure in the first flow conductor to allow fluid to flow through the check valve from the first to the second flow conductor, said check valve comprising: a tubular housing with an inner cylindrical wall and valve seat means adjacent one end thereof; a valve capsule operatively mounted within said housing; a first fluid sealing element disposed on one end of said capsule and engageable with said valve seat means for blocking a flow of fluid through said housing whenever a force generated against said first fluid sealing element produced by fluid pressure in the first conductor is insufficient to unseat said first fluid sealing element; lip seal means on said capsule spaced outwardly from said first fluid sealing element and sealingly engaging said inner surface of said housing to block fluid flow through said housing when said capsule is in a first pre-assembly operative position in said housing, deflecting means on said housing adjacent the valve seat means for deflecting said lip seal means away from sealing engagement with said cylindrical wall; and means for moving said capsule from said first pre-assembly operative position to a second operative position in which said lip seal means is deflected from fluid sealing engagement with said inner surface and said capsule is positioned so that said first fluid sealing element is engageable with said valve seat means.

7. The fluid flow check valve of claims 1 or 6 in which said deflecting means are provided by arcuately spaced convolutions formed in said housing to contact and deflect said lip seal when said capsule is displaced toward said second operative position in said housing thereby allowing fluid to flow past said lip seal means between said convolutions.

8. A fluid flow check valve for operatively connecting a fluid supply member to a fluid receiving member comprising: a tubular housing having an inlet end adapted to be connected to said fluid supply member and an outlet end adapted to be connected to said fluid receiving member; the housing further having an intermediate portion operatively connecting said inlet end to said outlet end; said intermediate portion defining an elongated cylindrical internal wall surface; an annular valve seat disposed between said intermediate portion and said inlet end; a valve capsule mounted in said intermediate portion of said housing and being selectively moved between a first pre-assembly operative position and second operative position therein; said capsule comprising an outer valve element in the form of an annular lip seal for sealing contacting said inner wall surface of said intermediate portion and an inner valve element telescopically mounted in said outer valve element; said inner valve element having seal means on an outer end thereof to sealing engage said annular valve seat; spring means operatively disposed in said capsule between said inner and outer valve elements to yieldably move said inner valve element into sealing contact with said valve seat; arcuately spaced seal deflecting means formed in said housing and outward of said valve seat to move said lip seal away from sealing engagement with said wall surface to thereby provide fluid flow passages between said lip seal and said seal deflecting means when said capsule is moved to said second position; said capsule being alternately positioned at a first pre-assembly operative position in which said lip seal sealingly contacts said inner housing wall and blocks the flow of fluid from said inlet to said outlet and positioned at a second operative position in which said lip seal is deflected from sealing engagement with said inner wall and said inner valve element is yieldably seated against said valve seat to block the flow from said inlet to said outlet until a sufficient force is produced against said inner valve element by increased fluid inlet pressure to overcome the force of said spring means and telescopically collapse said capsule thereby moving said inner valve element away from said valve seat means.

9. The check valve of claim 8, wherein said outlet end of said housing has spring retainer locking means therein and wherein said fluid receiving member is a delivery tube having a contact end for engaging said capsule and for moving and retaining said capsule to said second position when said delivery tube has been inserted into said housing and is retained therein by said spring retaining locking means.

10. A fuel delivery system for combustion chambers of an internal combustion engine comprising a supply of fuel, fuel feed passage means between said supply of fuel and said engine, a fuel pump for delivering fuel under pressure through said fuel feed passage means, and a fluid flow check valve located in the fuel feed passage means between the fuel pump and the engine to prevent fuel leakage into said combustion chambers of said engine, said fluid flow check valve comprising a housing having a valve seat therein, a valve capsule means mounted in said housing, said valve capsule having a sealing valve element on one end thereof, spring means in said capsule for biasing said sealing valve element against said valve seat to block the flow of fuel through said check valve, said valve element being moved off of said seat against the opposing force of said spring means in response to an increase of fuel pressure produced by said pump, and lip seal means on said valve capsule for annular sealing engagement with the inner wall of said housing when the valve capsule is in a first pre-assembly operative position and housing carried means to deflect said lip seal means from sealing engagement with the inner wall of said housing in response to positioning said capsule at a second operative position within said housing.

* * * * *